US011824733B2

(12) United States Patent
Garcarz et al.

(10) Patent No.: US 11,824,733 B2
(45) Date of Patent: Nov. 21, 2023

(54) DYNAMIC AI-DRIVEN SPLIT TUNNELING POLICIES FOR REMOTE TELEWORKERS

(71) Applicant: Cisco Technology, Inc., San Jose, CA (US)

(72) Inventors: Michal Wladyslaw Garcarz, Cracow (PL); Jean-Philippe Vasseur, Saint Martin d'Uriage (FR); Vinay Kumar Kolar, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 17/505,749

(22) Filed: Oct. 20, 2021

(65) Prior Publication Data

US 2023/0124343 A1    Apr. 20, 2023

(51) Int. Cl.
| | |
|---|---|
| *G06F 15/16* | (2006.01) |
| *H04L 41/16* | (2022.01) |
| *H04L 45/00* | (2022.01) |
| *H04L 41/5009* | (2022.01) |
| *H04L 43/55* | (2022.01) |
| *G06F 15/173* | (2006.01) |

(52) U.S. Cl.
CPC .......... *H04L 41/16* (2013.01); *H04L 41/5009* (2013.01); *H04L 43/55* (2022.05); *H04L 45/26* (2013.01)

(58) Field of Classification Search
CPC ..... H04L 41/16; H04L 41/5009; H04L 43/55; H04L 45/26
USPC ........................................................ 709/224
See application file for complete search history.

(56) References Cited

U.S. PATENT DOCUMENTS

| | | | |
|---|---|---|---|
| 7,751,331 B1* | 7/2010 | Blair ...................... | H04L 45/04 709/225 |
| 9,680,767 B2 | 6/2017 | Karthikeyan et al. | |
| 10,924,393 B2 | 2/2021 | Vasseur et al. | |
| 2003/0204619 A1* | 10/2003 | Bays ...................... | H04L 43/08 709/238 |
| 2015/0117203 A1* | 4/2015 | Filsfils ................ | H04L 12/4633 370/235 |
| 2015/0195190 A1* | 7/2015 | Shah Heydari ....... | H04L 41/147 714/47.3 |
| 2018/0063261 A1* | 3/2018 | Moghe ................... | G08G 1/123 |
| 2020/0274783 A1* | 8/2020 | Sharma ................ | H04L 43/045 |
| 2020/0305062 A1* | 9/2020 | Kharvar .............. | H04W 40/246 |

(Continued)

OTHER PUBLICATIONS

Chiba, et al., "Dynamic Authorization Extensions to Remote Authentication Dial In User Service (RADIUS)", Network Working Group, Request for Comments 5176, Jan. 2008, 34 pages, The IETF Trust.

*Primary Examiner* — Karen C Tang
(74) *Attorney, Agent, or Firm* — BEHMKE INNOVATION GROUP LLC; Kenneth J. Heywood; James J. Wong

(57) ABSTRACT

In one embodiment, a device obtains path probe data between one or more end-user sites and an online application. The device makes, based on the path probe data, a prediction as to whether a direct Internet access path or a backhaul path would offer better application performance for the online application. The device generates, based on the prediction, a split tunnel policy for a particular end-user site. The device causes a particular end-user site to connect to the online application in accordance with the split tunnel policy.

20 Claims, 10 Drawing Sheets

(56) References Cited

U.S. PATENT DOCUMENTS

2021/0112034 A1  4/2021  Balaji et al.
2021/0176091 A1  6/2021  Abraham
2021/0218642 A1  7/2021  Pasupathy et al.

* cited by examiner

DYNAMIC AI-DRIVEN SPLIT TUNNELING POLICIES FOR REMOTE TELEWORKERS

TECHNICAL FIELD

The present disclosure relates generally to computer networks, and, more particularly, to dynamic, artificial intelligence (AI)-driven split tunneling policies for remote teleworkers.

BACKGROUND

Software-defined wide area networks (SD-WANs) represent the application of software-defined networking (SDN) principles to WAN connections, such as connections to cellular networks, the Internet, and Multiprotocol Label Switching (MPLS) networks. The power of SD-WAN is the ability to provide consistent service level agreement (SLA) for important application traffic transparently across various underlying tunnels of varying transport quality and allow for seamless tunnel selection based on tunnel performance characteristics that can match application SLAs and satisfy the quality of service (QoS) requirements of the traffic (e.g., in terms of delay, jitter, packet loss, etc.).

In recent years, there has been a significant increase in the number of remote workers. Often referred to teleworking, this allows a worker to work from their home or other desired location, rather than requiring the worker to commute to an office or other location associated with their employer. These workers, like their in-office counterparts, still need to access various software-as-a-service (SaaS)/online applications. However, the routing options with respect to teleworkers and online applications are varied and selecting the wrong one can lead to degraded quality of experience (QoE) for a given application.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
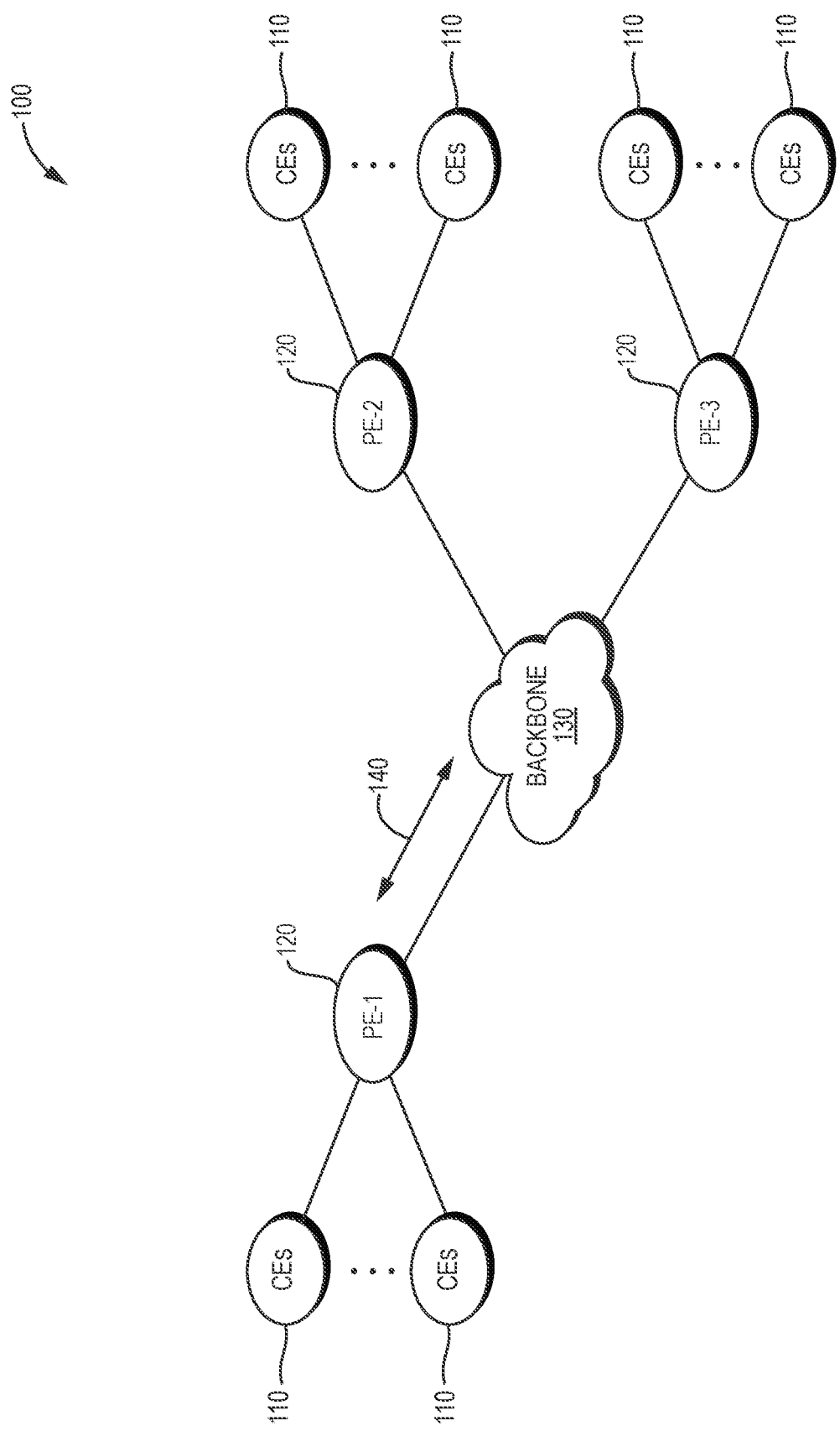
FIGS. 1A-1B illustrate an example communication network.

According to one or more embodiments of the disclosure, a device obtains path probe data between one or more end-user sites and an online application. The device makes, based on the path probe data, a prediction as to whether a direct Internet access path or a backhaul path would offer better application performance for the online application. The device generates, based on the prediction, a split tunnel policy for a particular end-user site. The device causes a particular end-user site to connect to the online application in accordance with the split tunnel policy.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network by the CE router via two primary links (e.g., from different Service Providers), with potentially a backup link (e.g., a 3G/4G/5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
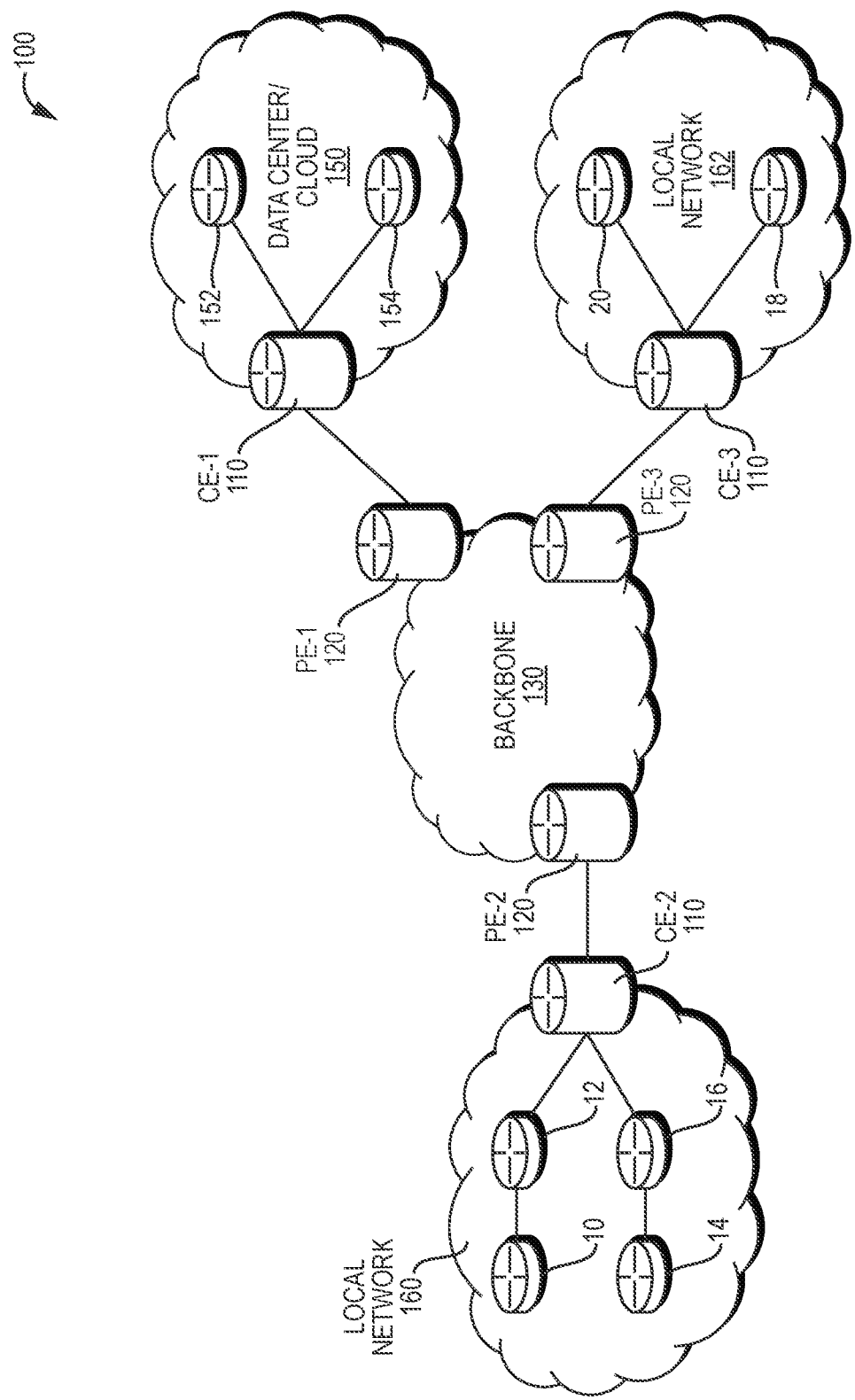

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

According to various embodiments, a software-defined WAN (SD-WAN) may be used in network 100 to connect local network 160, local network 162, and data center/cloud environment 150. In general, an SD-WAN uses a software defined networking (SDN)-based approach to instantiate tunnels on top of the physical network and control routing decisions, accordingly. For example, as noted above, one tunnel may connect router CE-2 at the edge of local network 160 to router CE-1 at the edge of data center/cloud environment 150 over an MPLS or Internet-based service provider network in backbone 130. Similarly, a second tunnel may also connect these routers over a 4G/5G/LTE cellular service provider network. SD-WAN techniques allow the WAN functions to be virtualized, essentially forming a virtual connection between local network 160 and data center/cloud environment 150 on top of the various underlying connections. Another feature of SD-WAN is centralized management by a supervisory service that can monitor and adjust the various connections, as needed.

Figure 2:
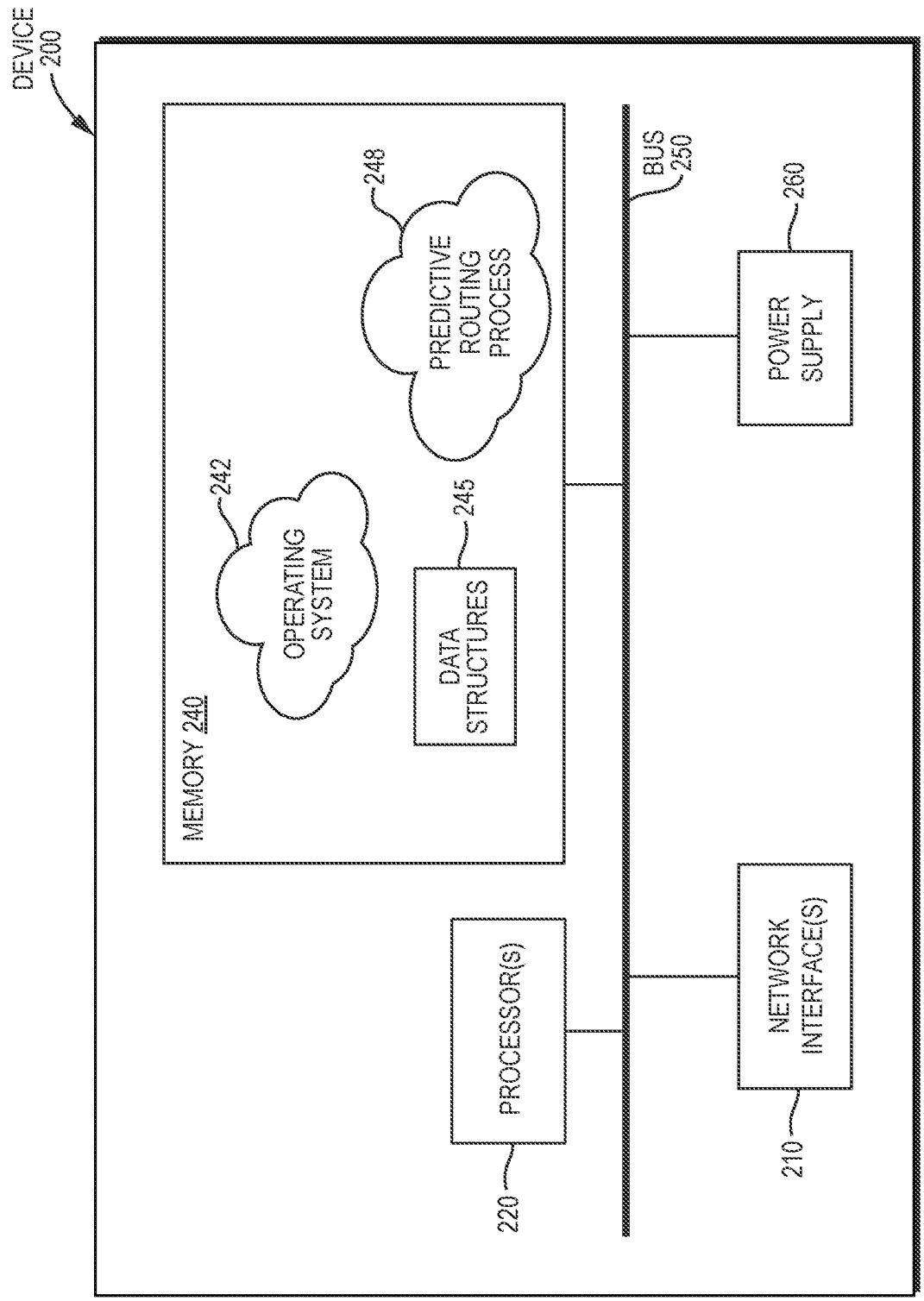
FIG. 2 illustrates an example network device/node.

FIG. 2 is a schematic block diagram of an example node/device 200 (e.g., an apparatus) that may be used with one or more embodiments described herein, e.g., as any of the computing devices shown in FIGS. 1A-1B, particularly the PE routers 120, CE routers 110, nodes/device 10-20, servers 152-154 (e.g., a network controller/supervisory service located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a predictive routing process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, predictive routing process 248 contains computer executable instructions executed by the processor 220 to perform routing functions in conjunction with one or more routing protocols. These functions may, on capable devices, be configured to manage a routing/forwarding table (a data structure 245) containing, e.g., data used to make routing/forwarding decisions. In various cases, connectivity may be discovered and known, prior to computing routes to any destination in the network, e.g., link state routing such as Open Shortest Path First (OSPF), or Intermediate-System-to-Intermediate-System (ISIS), or Optimized Link State Routing (OLSR). For instance, paths may be computed using a shortest path first (SPF) or constrained shortest path first (CSPF) approach. Conversely, neighbors may first be discovered (e.g., a priori knowledge of network topology is not known) and, in response to a needed route to a destination, send a route request into the network to determine which neighboring node may be used to reach the desired destination. Example protocols that take this approach include Ad-hoc On-demand Distance Vector (AODV), Dynamic Source Routing (DSR), DYnamic MANET On-demand Routing (DYMO), etc.

In various embodiments, as detailed further below, predictive routing process 248 may include computer executable instructions that, when executed by processor(s) 220, cause device 200 to perform the techniques described herein. To do so, in some embodiments, predictive routing process 248 may utilize artificial intelligence (AI)/machine learning. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, predictive routing process 248 may employ one or more supervised, unsupervised, or semi-supervised machine learning models. Generally, supervised learning entails the use of a training set of data, as noted above, that is used to train the model to apply labels to the input data. For example, the training data may include sample telemetry that has been labeled as being indicative of an acceptable performance or unacceptable performance. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior of the metrics. Semi-supervised learning models take a middle ground approach that uses a greatly reduced set of labeled training data.

Example machine learning techniques that predictive routing process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for time-series), random forest classification, or the like.

The performance of a machine learning model can be evaluated in a number of ways based on the number of true positives, false positives, true negatives, and/or false negatives of the model. For example, consider the case of a model that predicts whether the QoS of a path will satisfy the service level agreement (SLA) of the traffic on that path. In such a case, the false positives of the model may refer to the number of times the model incorrectly predicted that the QoS of a particular network path will not satisfy the SLA of the traffic on that path. Conversely, the false negatives of the model may refer to the number of times the model incorrectly predicted that the QoS of the path would be acceptable. True negatives and positives may refer to the number of times the model correctly predicted acceptable path performance or an SLA violation, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

As noted above, in software defined WANs (SD-WANs), traffic between individual sites are sent over tunnels. The tunnels are configured to use different switching fabrics, such as MPLS, Internet, 4G or 5G, etc. Often, the different switching fabrics provide different QoS at varied costs. For example, an MPLS fabric typically provides high QoS when compared to the Internet, but is also more expensive than traditional Internet. Some applications requiring high QoS (e.g., video conferencing, voice calls, etc.) are traditionally sent over the more costly fabrics (e.g., MPLS), while applications not needing strong guarantees are sent over cheaper fabrics, such as the Internet.

Traditionally, network policies map individual applications to Service Level Agreements (SLAs), which define the satisfactory performance metric(s) for an application, such as loss, latency, or jitter. Similarly, a tunnel is also mapped to the type of SLA that is satisfies, based on the switching fabric that it uses. During runtime, the SD-WAN edge router then maps the application traffic to an appropriate tunnel. Currently, the mapping of SLAs between applications and tunnels is performed manually by an expert, based on their experiences and/or reports on the prior performances of the applications and tunnels.

The emergence of infrastructure as a service (IaaS) and software-as-a-service (SaaS) is having a dramatic impact of the overall Internet due to the extreme virtualization of services and shift of traffic load in many large enterprises. Consequently, a branch office or a campus can trigger massive loads on the network.

Figure 3A:
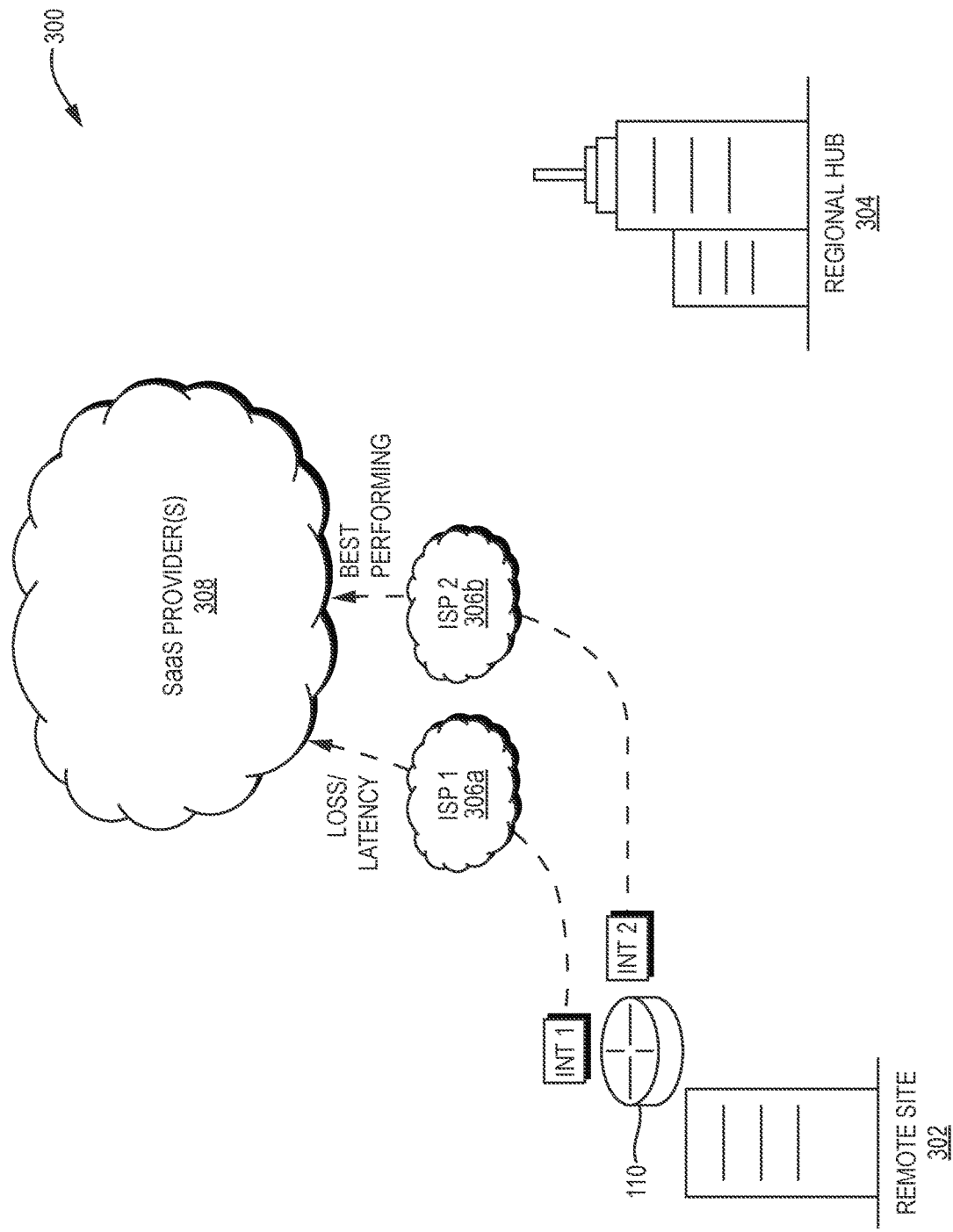
FIGS. 3A-3B illustrate example network deployments.
Figure 3B:
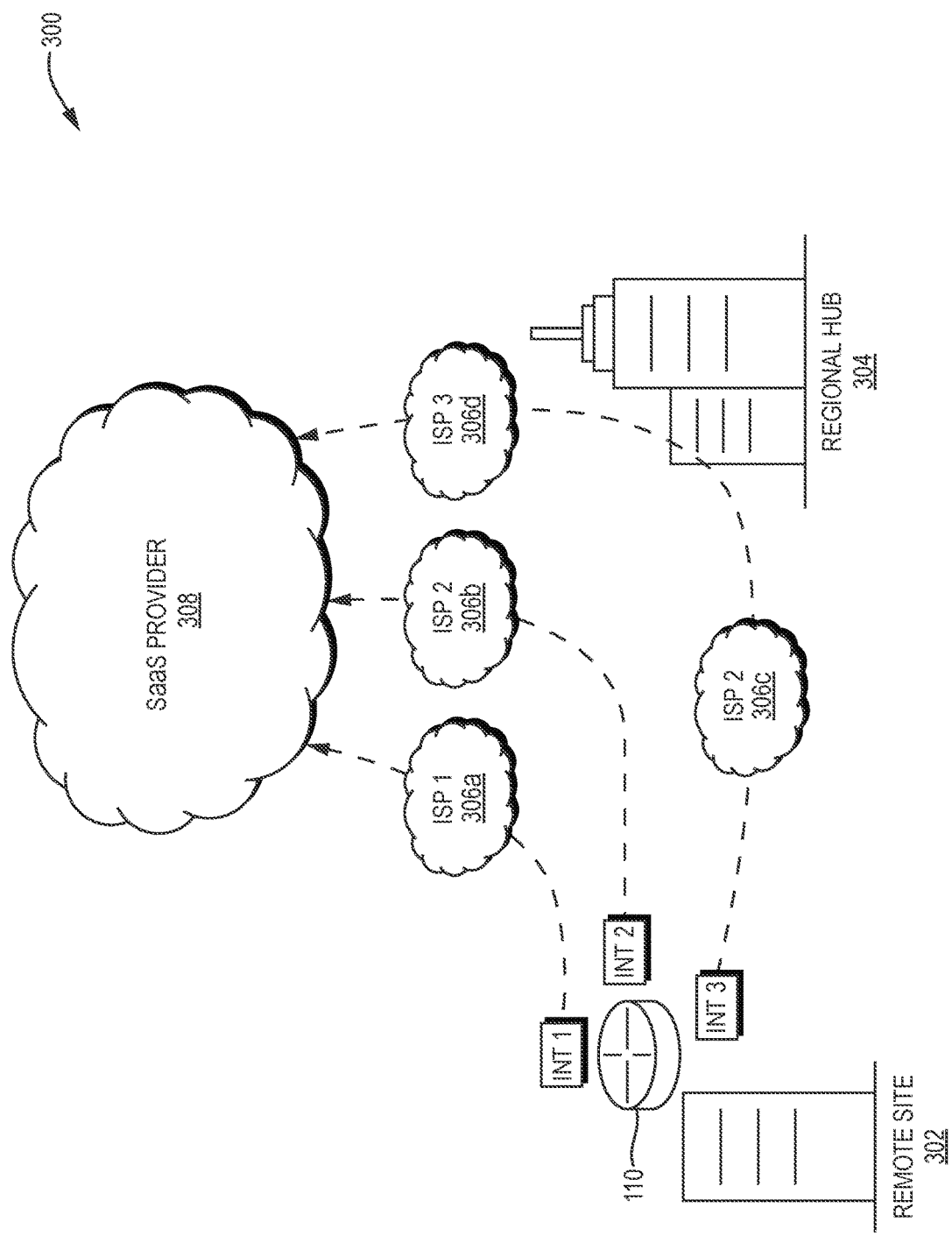

FIGS. 3A-3B illustrate example network deployments 300, 310, respectively. As shown, a router 110 located at the edge of a remote site 302 may provide connectivity between a local area network (LAN) of the remote site 302 and one or more cloud-based, SaaS providers 308. For example, in the case of an SD-WAN, router 110 may provide connectivity to SaaS provider(s) 308 via tunnels across any number of networks 306. This allows clients located in the LAN of remote site 302 to access cloud applications (e.g., Office 365™, Dropbox™, etc.) served by SaaS provider(s) 308.

As would be appreciated, SD-WANs allow for the use of a variety of different pathways between an edge device and an SaaS provider. For example, as shown in example network deployment 300 in FIG. 3A, router 110 may utilize two Direct Internet Access (DIA) connections to connect with SaaS provider(s) 308. More specifically, a first interface of router 110 (e.g., a network interface 210, described previously), Int 1, may establish a first communication path (e.g., a tunnel) with SaaS provider(s) 308 via a first Internet Service Provider (ISP) 306a, denoted ISP 1 in FIG. 3A. Likewise, a second interface of router 110, Int 2, may establish a backhaul path with SaaS provider(s) 308 via a second ISP 306b, denoted ISP 2 in FIG. 3A.

FIG. 3B illustrates another example network deployment 310 in which Int 1 of router 110 at the edge of remote site 302 establishes a first path to SaaS provider(s) 308 via ISP 1 and Int 2 establishes a second path to SaaS provider(s) 308 via a second ISP 306b. In contrast to the example in FIG. 3A, Int 3 of router 110 may establish a third path to SaaS provider(s) 308 via a private corporate network 306c (e.g., an MPLS network) to a private data center or regional hub 304 which, in turn, provides connectivity to SaaS provider(s) 308 via another network, such as a third ISP 306d.

Regardless of the specific connectivity configuration for the network, a variety of access technologies may be used (e.g., ADSL. 4G, 5G, etc.) in all cases, as well as various networking technologies (e.g., public Internet, MPLS (with or without strict SLA), etc.) to connect the LAN of remote site 302 to SaaS provider(s) 308. Other deployments scenarios are also possible, such as using Colo, accessing SaaS provider(s) 308 via Zscaler or Umbrella services, and the like.

Figure 4A:
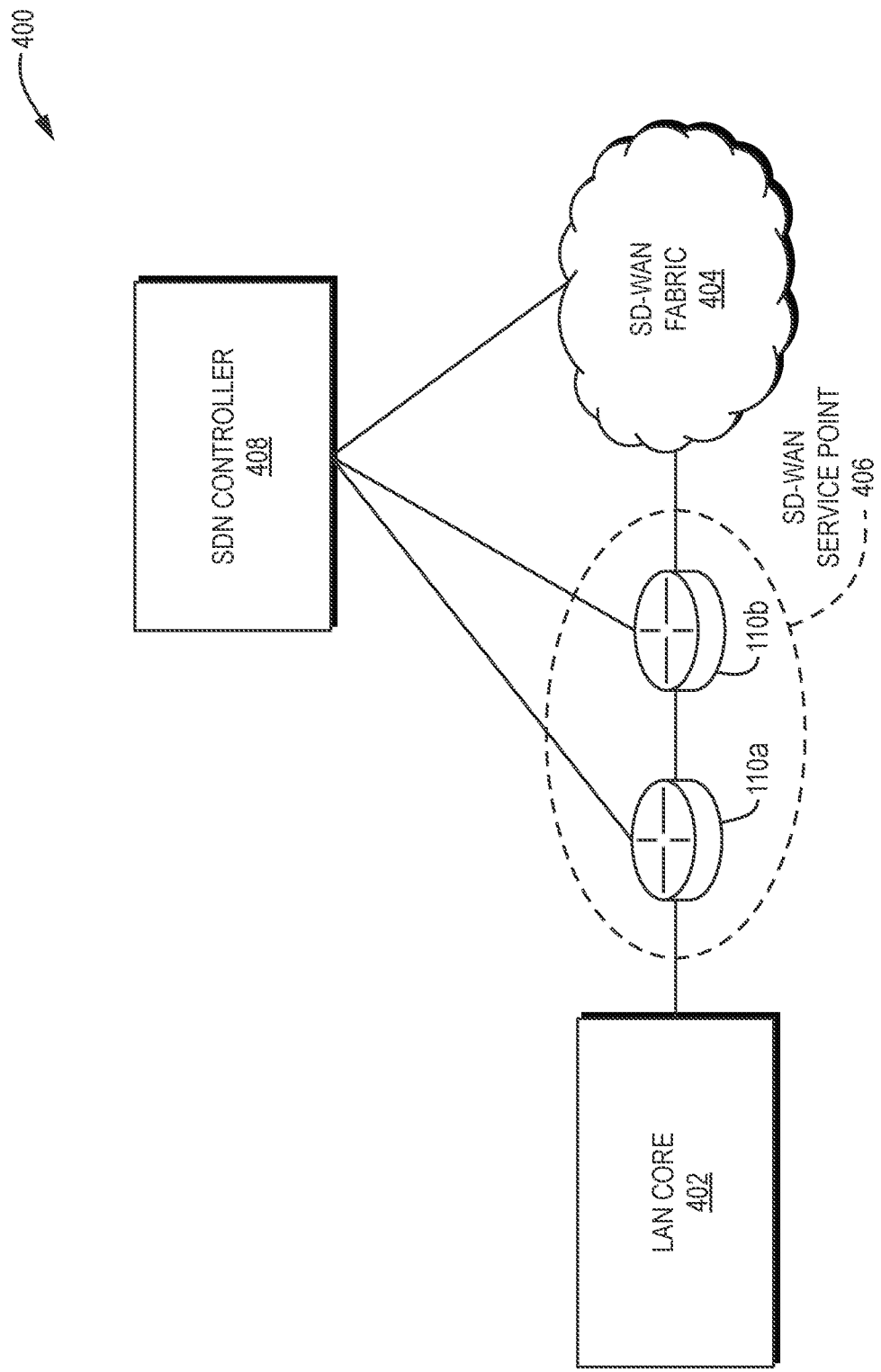
FIGS. 4A-4B illustrate example software defined network (SDN) implementations.

FIG. 4A illustrates an example SDN implementation 400, according to various embodiments. As shown, there may be a LAN core 402 at a particular location, such as remote site 302 shown previously in FIGS. 3A-3B. Connected to LAN core 402 may be one or more routers that form an SD-WAN service point 406 which provides connectivity between LAN core 402 and SD-WAN fabric 404. For instance. SD-WAN service point 406 may comprise routers 110a-110b.

Overseeing the operations of routers 110a-110b in SD-WAN service point 406 and SD-WAN fabric 404 may be an SDN controller 408. In general, SDN controller 408 may comprise one or more devices (e.g., a device 200) configured to provide a supervisory service, typically hosted in the cloud, to SD-WAN service point 406 and SD-WAN fabric 404. For instance, SDN controller 408 may be responsible for monitoring the operations thereof, promulgating policies (e.g., security policies, etc.), installing or adjusting IPsec routes/tunnels between LAN core 402 and remote destinations such as regional hub 304 and/or SaaS provider(s) 308 in FIGS. 3A-3B, and the like.

As noted above, a primary networking goal may be to design and optimize the network to satisfy the requirements of the applications that it supports. So far, though, the two worlds of "applications" and "networking" have been fairly siloed. More specifically, the network is usually designed in order to provide the best SLA in terms of performance and reliability, often supporting a variety of Class of Service (CoS), but unfortunately without a deep understanding of the actual application requirements. On the application side, the networking requirements are often poorly understood even for very common applications such as voice and video for which a variety of metrics have been developed over the past two decades, with the hope of accurately representing the Quality of Experience (QoE) from the standpoint of the users of the application.

More and more applications are moving to the cloud and many do so by leveraging an SaaS model. Consequently, the number of applications that became network-centric has grown approximately exponentially with the raise of SaaS applications, such as Office 365, ServiceNow, SAP, voice, and video, to mention a few. All of these applications rely heavily on private networks and the Internet, bringing their own level of dynamicity with adaptive and fast changing workloads. On the network side, SD-WAN provides a high degree of flexibility allowing for efficient configuration management using SDN controllers with the ability to benefit from a plethora of transport access (e.g., MPLS, Internet with supporting multiple CoS, LTE, satellite links, etc.), multiple classes of service and policies to reach private and public networks via multi-cloud SaaS.

Furthermore, the level of dynamicity observed in today's network has never been so high. Millions of paths across thousands of Service Provides (SPs) and a number of SaaS applications have shown that the overall QoS(s) of the network in terms of delay, packet loss, jitter, etc. drastically vary with the region, SP, access type, as well as over time with high granularity. The immediate consequence is that the environment is highly dynamic due to:

New in-house applications being deployed;
New SaaS applications being deployed everywhere in the network, hosted by a number of different cloud providers;
Internet, MPLS, LTE transports providing highly varying performance characteristics, across time and regions;
SaaS applications themselves being highly dynamic: it is common to see new servers deployed in the network. DNS resolution allows the network for being informed of a new server deployed in the network leading to a new destination and a potentially shift of traffic towards a new destination without being even noticed.

According to various embodiments, application aware routing usually refers to the ability to rout traffic so as to satisfy the requirements of the application, as opposed to exclusively relying on the (constrained) shortest path to reach a destination IP address. Various attempts have been made to extend the notion of routing, CSPF, link state routing protocols (ISIS, OSPF, etc.) using various metrics (e.g., Multi-topology Routing) where each metric would reflect a different path attribute (e.g., delay, loss, latency, etc.), but each time with a static metric. At best, current approaches rely on SLA templates specifying the application requirements so as for a given path (e.g., a tunnel) to be "eligible" to carry traffic for the application. In turn, application SLAs are checked using regular probing. Other solutions compute a metric reflecting a particular network characteristic (e.g., delay, throughput, etc.) and then selecting the supposed 'best path,' according to the metric.

The term 'SLA failure' refers to a situation in which the SLA for a given application, often expressed as a function of delay, loss, or jitter, is not satisfied by the current network path for the traffic of a given application. This leads to poor QoE from the standpoint of the users of the application. Modern SaaS solutions like Viptela, CloudonRamp SaaS, and the like, allow for the computation of per application QoE by sending HyperText Transfer Protocol (HTTP) probes along various paths from a branch office and then route the application's traffic along a path having the best QoE for the application. At a first sight, such an approach may solve many problems. Unfortunately, though, there are several shortcomings to this approach:

The SLA for the application is 'guessed.' using static thresholds.

Routing is still entirely reactive: decisions are made using probes that reflect the status of a path at a given time, in contrast with the notion of an informed decision.

SLA failures are very common in the Internet and a good proportion of them could be avoided (e.g., using an alternate path), if predicted in advance.

Figure 4B:
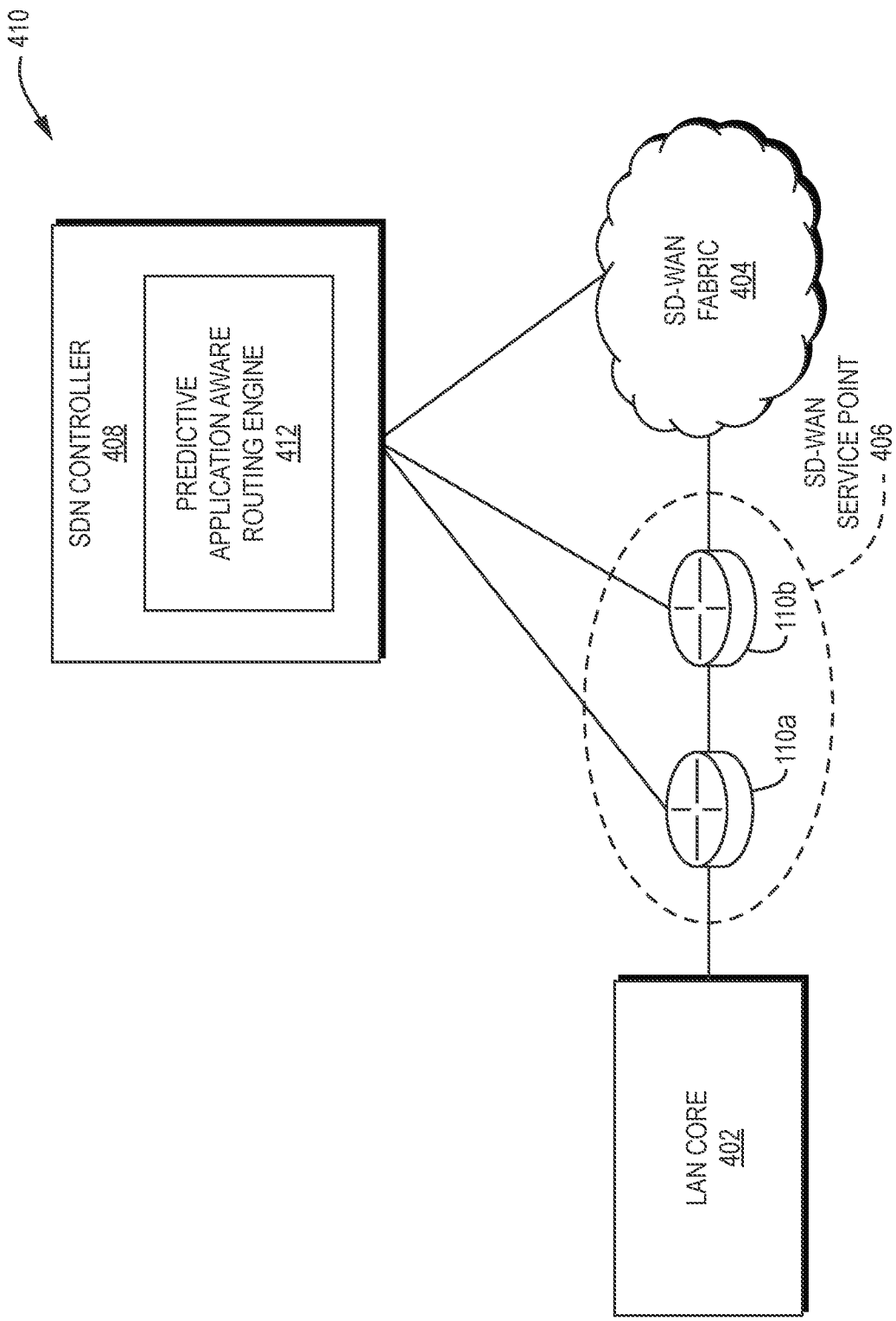

In various embodiments, the techniques herein allow for a predictive application aware routing engine to be deployed, such as in the cloud, to control routing decisions in a network. For instance, the predictive application aware routing engine may be implemented as part of an SDN controller (e.g., SDN controller 408) or other supervisory service, or may operate in conjunction therewith. For instance, FIG. 4B illustrates an example 410 in which SDN controller 408 includes a predictive application aware routing engine 412 (e.g., through execution of predictive routing process 248). Further embodiments provide for predictive application aware routing engine 412 to be hosted on a router 110 or at any other location in the network.

During execution, predictive application aware routing engine 412 makes use of a high volume of network and application telemetry (e.g., from routers 110a-110b, SD-WAN fabric 404, etc.) so as to compute statistical and/or machine learning models to control the network with the objective of optimizing the application experience and reducing potential down times. To that end, predictive application aware routing engine 412 may compute a variety of models to understand application requirements, and predictably route traffic over private networks and/or the Internet, thus optimizing the application experience while drastically reducing SLA failures and downtimes.

In other words, predictive application aware routing engine 412 may first predict SLA violations in the network that could affect the QoE of an application (e.g., due to spikes of packet loss or delay, sudden decreases in bandwidth, etc.). In other words, predictive application aware routing engine 412 may use SLA violations as a proxy for actual QoE information (e.g., ratings by users of an online application regarding their perception of the application), unless such QoE information is available from the provider of the online application. In turn, predictive application aware routing engine 412 may then implement a corrective measure, such as rerouting the traffic of the application, prior to the predicted SLA violation. For instance, in the case of video applications, it now becomes possible to maximize throughput at any given time, which is of utmost importance to maximize the QoE of the video application. Optimized throughput can then be used as a service triggering the routing decision for specific application requiring highest throughput, in one embodiment. In general, routing configuration changes are also referred to herein as routing "patches," which are typically temporary in nature (e.g., active for a specified period of time) and may also be application-specific (e.g., for traffic of one or more specified applications).

As noted above, many employees are now working from home and hybrid work is getting a lot of traction in corporate and other settings. Such remote users need to have access to company resources, such as through the use of virtual private networks (VPNs), etc., as well as to a variety of SaaS applications which are hosted in the Internet. Ensuring application QoE is critical, as poor QoE can greatly decrease their productivity.

In remote working scenarios, there are typically two ways that a user can access an SaaS application: either 1.) via a Direct Internet Access (DIA) connection the SaaS application or 2.) via a backhaul connection through a company facility/data center. However, testing has reveled that the QoE offered by a DIA or backhaul connection for different online applications depends on a number of factors:

1. The end-user and their site
2. The service provider of the end-user site
3. The location of the end-user site
4. The specific application being accessed (e.g., how it changes locations/migrates)
5. The location of the corporate facility/data center associated with the backhaul path to the application
6. The service provider serving that corporate facility/data center
7. The location of the SaaS point of presence (POP)
8. Routing between the different service providers
9. The time and load on intermediate service providers Thus, depending on the circumstances for some applications, it may be better for an end-user to connect to a particular SaaS application via DIA or a backhaul/corporate connection.

Dynamic AI-Driven Split Tunneling Policies for Remote Teleworkers

The techniques herein introduce system and methods for predictive application-driven routing for remote workers and other users. In some aspects, probing mechanisms are introduced herein to gather application feedback metrics from multiple paths (e.g., DIA and backhaul), as well as mechanisms to eliminate the need to send probes from every end-point. In further aspects, the resulting path probe data can be used to forecast the best path to send the application data, using statistical or machine learning models. In yet another aspect, the best split-tunnel routing policy may be dynamically pushed to the end-points which enables remote uses to route via the best path for all applications. As would be appreciated, such application aware predictive routing for remote workers would enhance their application experiences for different online/SaaS applications by significantly reducing the inefficient routing that currently prevails when users are using a VPN.

Illustratively, the techniques described herein may be performed by hardware, software, and/or firmware, such as in accordance with predictive routing process 248, which may include computer executable instructions executed by the processor 220 (or independent processor of interfaces 210) to perform functions relating to the techniques described herein.

Specifically, according to various embodiments, a device obtains path probe data between one or more end-user sites and an online application. The device makes, based on the path probe data, a prediction as to whether a direct Internet access path or a backhaul path would offer better application performance for the online application. The device generates, based on the prediction, a split tunnel policy for a particular end-user site. The device causes a particular end-user site to connect to the online application in accordance with the split tunnel policy.

Figure 5:
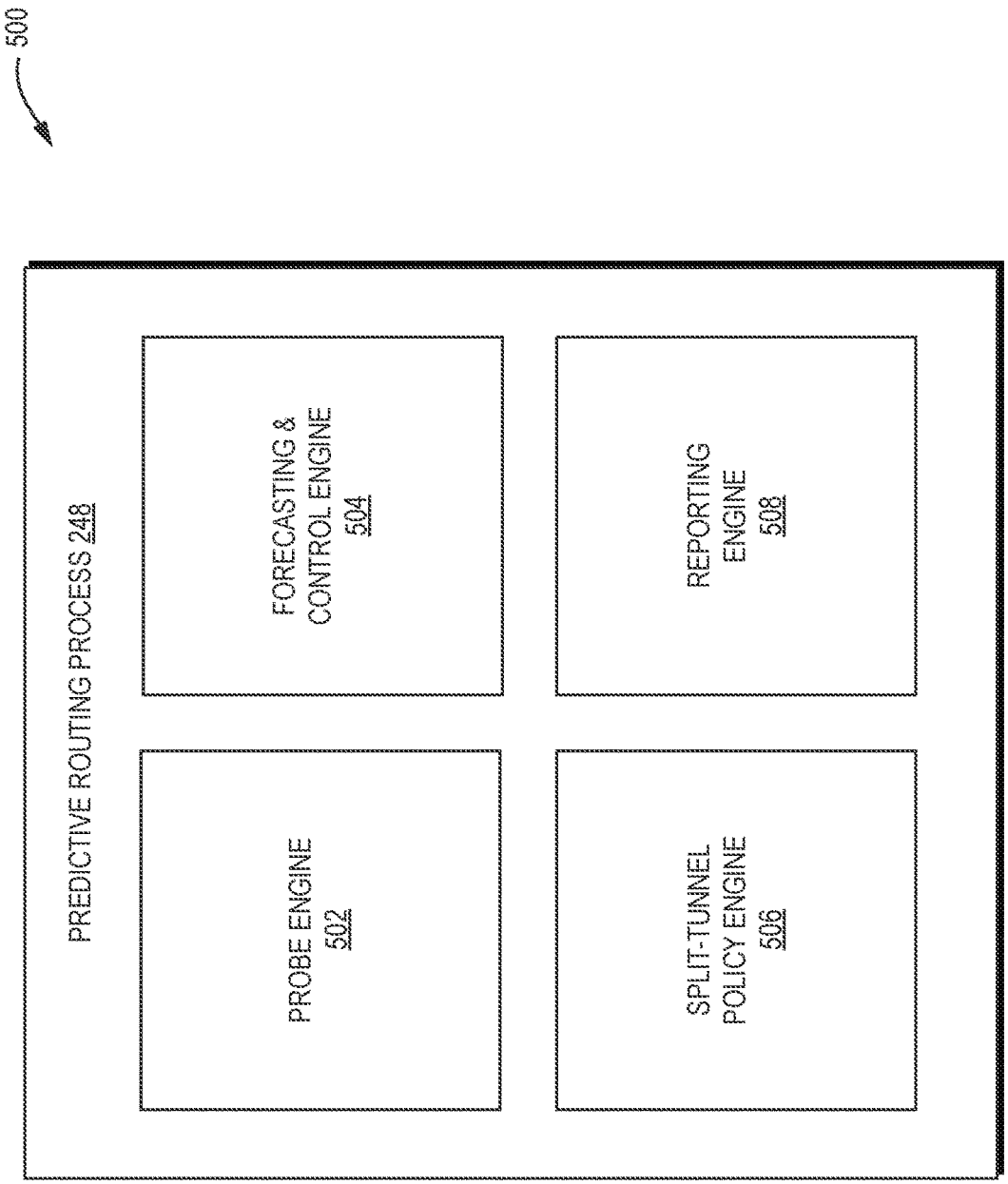
FIG. 5 illustrates an example architecture for generating a split tunnel policy for an online application.

Operationally, FIG. 5 illustrates an example architecture 500 for generating a split tunnel policy for an online application, according to various embodiments. At the core of architecture 500 is predictive routing process 248, which may be executed by a controller for a network or another device in communication therewith. For instance, predictive routing process 248 may be executed by a controller for a network (e.g., SDN controller 408 in FIGS. 4A-4B), a particular networking device in the network (e.g., a router, etc.), another device or service in communication therewith, or the like. In some embodiments, for instance, predictive routing process 248 may be used to implement a predictive application aware routing engine, such as predictive application aware routing engine 412.

As shown, predictive routing process 248 may include any or all of the following components: a probe engine 502, a forecasting and control engine 504, a split-tunnel policy engine 506, and/or a reporting engine 508. As would be appreciated, the functionalities of these components may be combined or omitted, as desired. In addition, these components may be implemented on a singular device or in a distributed manner, in which case the combination of executing devices can be viewed as their own singular device for purposes of executing predictive routing process 248.

In various embodiments, probe engine 502 may be responsible for obtaining the network quality of service (QoS) metrics and application experience metrics from different network vantage points, in order to compute the experience along split tunnels. For instance, probing systems such as ThousandEyes can be leveraged to probe the network paths from different vantage points.

Figure 6:
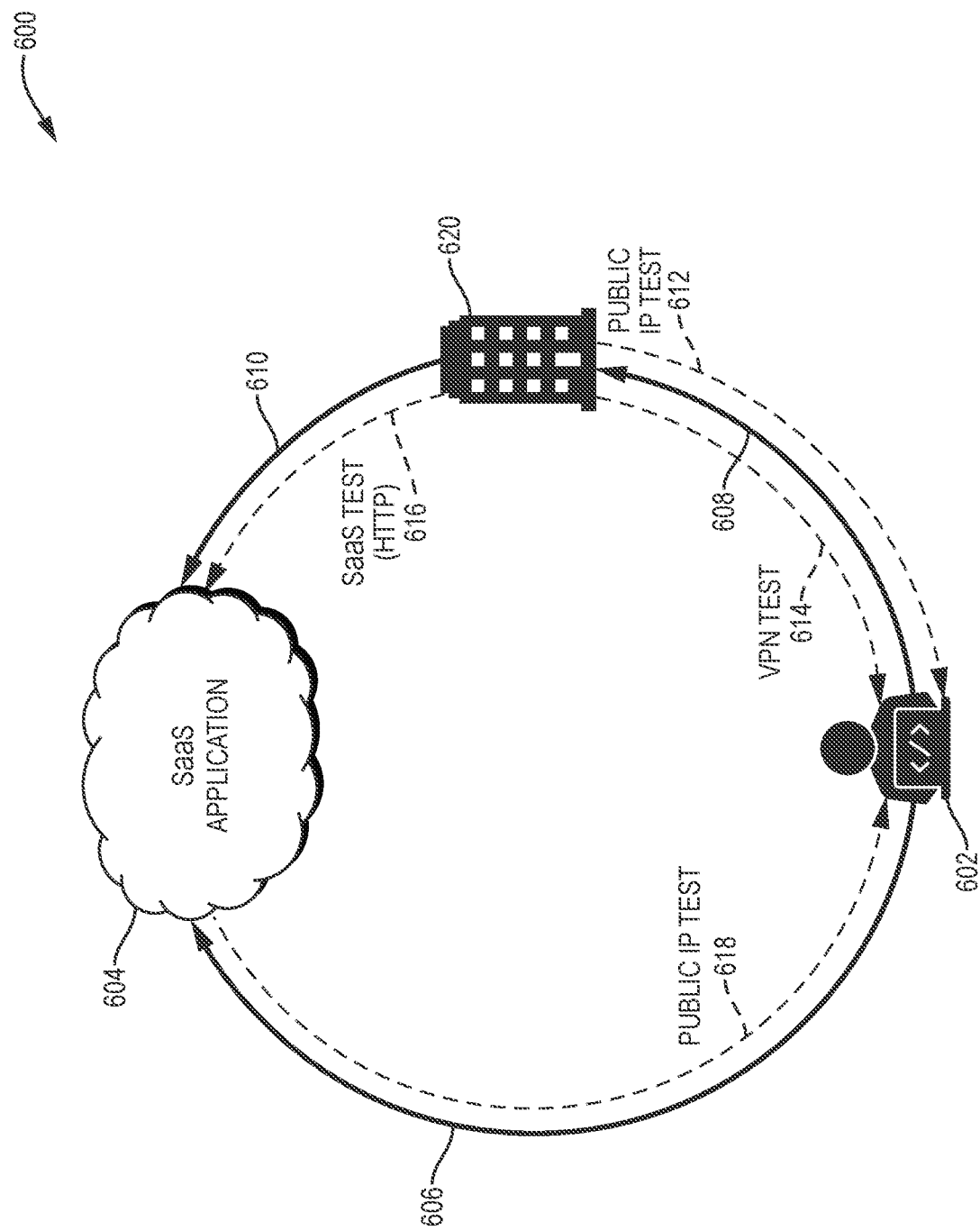
FIG. 6 illustrates an example of various paths to an online application.

To illustrate the various path probe data that can be obtained for consumption by probe engine 502, FIG. 6 shows an example 600 of an end-user device 602 located at a particular end-user site (e.g., the home of its operator, a café, etc.). Typically, end-user device 602 may execute a VPN client application that allows end-user device 602 to connect to a datacenter 620 operated by their employer, as in the case of a teleworker, or other entity. Thus, one potential way for end-user device 602 to connect to a SaaS application 604 (e.g., a POP for the application) is through a backhauled connection that includes path 608 between end-user device 602 and datacenter 620, as well as path 610 between datacenter 620 and SaaS application 604. Another alternate connection that end-user device 602 may use to connect to SaaS application 604 may also consist of using a DIA connection over path 606 to SaaS application 604.

Various probe tests can be conducted by probing agents (e.g., ThousandEyes agents, etc.) located at the different locations, to assess the performance metrics for the various paths 606-610. For instance, a probing agent executed at the POP for SaaS application 604 may conduct a public IP test 618, to measure the performance characteristics of path 606 over the public Internet. This probing may capture path information such as latency, loss, jitter, page load time, or the like. This information can be useful for assessing whether the path is likely to degrade application experience for SaaS application 604, such as when SLA violations occur. In further instances, the probing can also test some measure of the application experience itself, such as page load times or the like. In one embodiment, custom probes may also be sent, as desired.

Similarly, a probing agent located at datacenter 620 may perform various probing tests, to measure paths 608-610. For instance, such a probing agent may perform a public IP test 612, to measure these characteristics of path 608 over the public Internet. Another potential test of path 608 with datacenter 620 may be VPN test 614 that also measures these characteristics, were path 608 to take the form of a VPN tunnel between end-user device 602 and datacenter 620. Finally, the probing agent at datacenter 620 may also perform SaaS test 616 (e.g., an HTTP-based test), to measure the performance associated with path 610.

As would be appreciated, it may also be possible to execute a probing agent at the site of end-user device 602, either on the local device, an edge router at the site, or the like. However, deploying probing agents in this manner may be impractical and is optional for purposes of implementing the techniques herein.

The resulting path probing data from performing tests 612-618 may then be reported back to probe engine 502 for ingestion. Consequently, probe engine 502 will now have both QoS metrics for the different connection options for end-user device 602, as well as, potentially, some measure of the application quality (e.g., page load times, etc.) for SaaS application 604 associated with those different paths.

Referring again to FIG. 5, probe engine 502 will now have performance metrics for the following paths:

End-user site to company site

Company site to SaaS application

SaaS application to end-user client

Having network and application metrics for all three of the above paths allows predictive routing process 248 to compute which one is faster:

From end-user site/client to SaaS application through a backhaul connection via the company site/datacenter From end-user site/client directly to the SaaS via the public Internet In yet another embodiment, a subset of user end-points may be chosen to run tests, and probe engine 502 can use these results to approximate results for nearby sites or clients, such as those connected to the same service provider. For example, few end-points for every <SP, city> combination may be chosen to run probing tests. In turn, probe engine 502 can aggregate the results and use them to approximate results for many more users who use the same service provider and are in the same city.

In various embodiments, predictive routing process 248 may also include forecasting and control engine 504, which is responsible for using the path probing data obtained by probe engine 502 for a.) utilizing data for each user and each application, b.) predicting whether DIA or VPN would offer better application experience to an end-user site/client, and c.) selecting the best path to transmit the application traffic.

To make its predictions, forecasting and control engine 504 may represent the DIA and backhaul routes as generic paths. For instance, a DIA route may be represented as a tuple <user-end-point-id, interface, application>. Similarly, a backhaul route may be represented by a tuple <user-end-point-id, vpn-interface, DC-id, DC-interface, application>. Note that the data from probe engine 502 can be used to measure the network QoS and application experience over both of these paths.

In one embodiment, forecasting and control engine 504 may select time-series of application experience for each path from the end-user site/client. For example, consider a user device that has one DIA path (PDIA) and one backhaul connection to a given data center (PDC). The measured page load times for a SaaS application A can be considered as one application experience metric. Forecasting and control engine 504 may then fetch a time-series of page load times for each path and for each SaaS application A from probe engine 502 (e.g., loadA(PDIA,t) and, loadA(PDC,t) for time t).

Using the selected data, forecasting and control engine 504 may train a forecasting model to predict the load for both the paths PDIA and PDC. This can be achieved using any number of different forecasting approaches, such as auto-regressive integrated moving average (ARIMA) models, Holt-Winters or other regression models such as linear regression, XGBoost, or the like. Based on the forecasted load for two different paths, forecasting and control engine 504 can then select the 'best' path for application A.

In another embodiment, network QoS metrics (loss, latency) on VPN and network ping tests (e.g., another form of ThousandEyes tests) can be first used to map to a probability of SLA violation. For example, for a voice conferencing system, the SLA can be defined to be violated if loss>3%, latency>300 ms and jitter>50 ms. Based on this, forecasting and control engine 504 can train a model to forecast whether the application SLA will be violated at time t. In turn, forecasting and control engine 504 can use this forecast to choose the best path to the online application.

In yet other embodiment, a set of network and application experience metrics can be combined to access the 'goodness' of the path. This metric can be forecasted and forecasting and control engine 504 can base its path selection on the metric.

Another potential component of predictive routing process 248 may be split-tunnel policy engine 506, which is responsible for maintaining (bookkeeping) and pushing the best predicted split-tunnel policy for each application to the VPN concentrator, AAA subsystem, or the like, that is responsible for controlling and pushing policies to endpoints. In other cases, split-tunnel policy engine 506 may send a configuration directly to the end-user site/client, directly, in accordance with the split-tunnel policy. In other words, a primary function of split-tunnel policy engine 506 is to generate a split-tunnel policy for a given end-user site/client and a particular online application, as well as to cause the end-user site/client to connect to that application in accordance with the policy.

In one embodiment, split-tunnel policy engine 506 may also store the current best policy for every user and application. This allows the VPN software on the end-user device to retrieve the split-tunnel policy. In yet another embodiment, a centralized policy engine, such as the Identity Services Engine by Cisco Systems, Inc., can also fetch the policy and enforce it.

Said differently, split-tunnel policy engine 506 may collect the predictions by forecasting and control engine 504 on a regular basis. In turn, based on the predictions, 506 may generate split-tunnel policies that are then pushed to the VPN software on the corresponding end-user device. For example, if forecasting and control engine 504 provides an hourly forecast of the best path, split-tunnel policy engine 506 may observe the current best path. If the predicted best path is different than the current path, it may push the policy to the end-user device. In one embodiment, this can be by pushing the policy directly to the end-points. In other embodiment, split-tunnel policy engine 506 can dynamically change the split-tunneling policies dynamically in a real-time if needed using Radius Change of Authorization (reauthorizing VPN sessions).

In various embodiments, predictive routing process 248 may also include reporting engine 508, which is responsible for interfacing predictive routing process 248 with one or more user interfaces. For instance, reporting engine 508 may report a suggested or implemented split-tunnel policy for display to an administrator, so as to report the change and its potential gain in terms of application QoE. Indeed, it is imperative to track such close-loop control actions, along with their performance. To that end, reporting engine 508 may automatically provide reports each time a policy is updated and further QoE values related to the application and policy change may be monitored and reported for a given period of time. This allows an administrator to review and/or approve split-tunnel policy changes over time.

Figure 7:
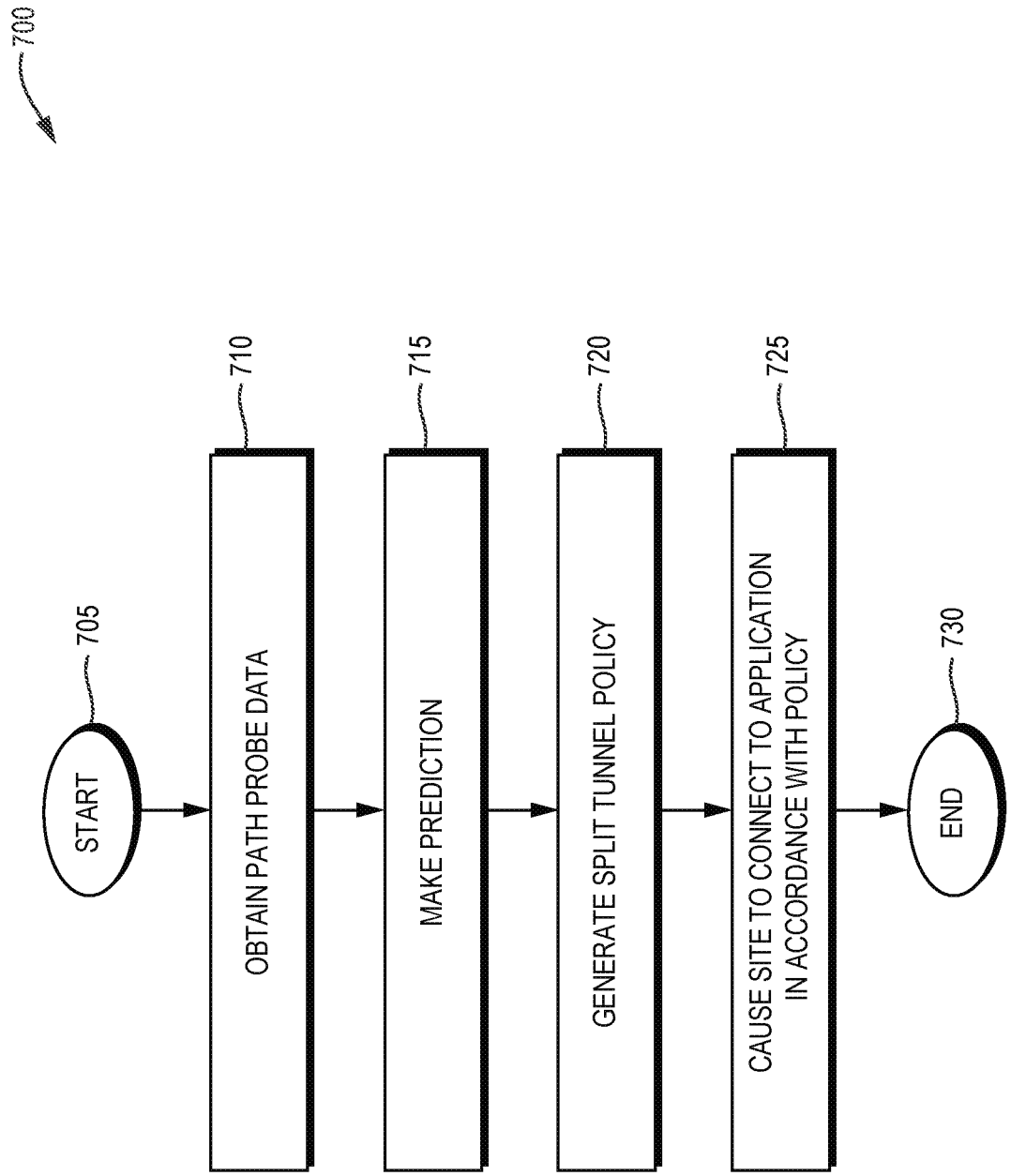
FIG. 7 illustrates an example simplified procedure for generating a split tunnel policy for an end-user site.

FIG. 7 illustrates an example simplified procedure 700 (e.g., a method) for generating a split tunnel policy for an end-user site, in accordance with one or more embodiments described herein. For example, a non-generic, specifically configured device (e.g., device 200), such as controller for a network (e.g., an SDN controller, an edge router, or other supervisory device) may perform procedure 700 by executing stored instructions (e.g., predictive routing process 248). The procedure 700 may start at step 705, and continues to step 710, where, as described in greater detail above, the device may obtain path probe data between one or more end-user sites and an online application. For instance, the online application may take the form of an SaaS application. Such path probe data may include metrics such as page load time metrics, path delay, jitter, or loss metrics, or the like. In one embodiment, the path probe data may be for one or more other sites that differ from a particular site for which a split-tunnel policy is being generated. For instance, the device may use path probing data from nearby other sites (e.g., those in the same geographic area and use the same service provider) as proxy data for the particular site.

At step 715, as detailed above, the device may make, based on the path probe data, a prediction as to whether a direct Internet access path or a backhaul path would offer better application performance for the online application. In some embodiments, the prediction may be based in part on a forecasted SLA violation for the online application. In other embodiments, the prediction may be based on a predicted drop in QoE, such as page load time, measured QoE (e.g., as reported by users of the application), or the like.

At step 720, the device may generate, based on the prediction, a split tunnel policy for a particular end-user site, as described in greater detail above. In some embodiments, the split tunnel policy specifies a network path that the particular end-user site should use to connect to the online application. In another embodiment, the split tunnel policy causes the particular end-user site to connect to the online application via a particular direct Internet access connection. In a further embodiment, the split tunnel policy causes the particular end-user site to connect to the online application using a particular virtual private network path and via a backhaul connection through a particular data center.

At step 725, as detailed above, the device may cause a particular end-user site to connect to the online application in accordance with the split tunnel policy. In some embodiments, the device may do so by providing the split tunnel policy to a virtual private network client executed by an end-user device at the particular end-user site. In other embodiments, the device may do so in part by receiving, from a user interface, an instruction to apply the split tunnel policy to the particular end-user site. Procedure 700 then ends at step 730.

It should be noted that while certain steps within procedure 700 may be optional as described above, the steps shown in FIG. 7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, allow for a predictive routing system to learn and forecast the best split tunneling policies for each online application and for each user/end-user site. This is done using a variety of probes and statistical/machine-learning algorithms. In further aspects, the optimal configuration per user or group may be pushed to enforce the proposed policies. In other aspects, the techniques herein introduce probing mechanisms that allows for the measurement of QoE per SaaS application. This can be triggered in a way that avoids the need to deploy a dedicated probing agent at each end-user site, which is computationally expensive and may degrade endpoint performance.

While there have been shown and described illustrative embodiments that provide for dynamic AI-driven split tunneling policies, it is to be understood that various other adaptations and modifications may be made within the spirit and scope of the embodiments herein. For example, while certain embodiments are described herein with respect to using certain models for purposes of predicting application experience metrics, SLA violations, or other disruptions in a network, the models are not limited as such and may be used for other types of predictions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

The invention claimed is:

1. A method comprising:
   obtaining, by a device, path probe data between one or more end-user sites and an online application;
   making, by the device and based on the path probe data, a prediction using a trained forecasting model as to whether a direct Internet access path or a backhaul path would offer better application performance for the online application;
   generating, by the device and based on the prediction, a split tunnel policy for a particular end-user site; and
   causing, by the device, the particular end-user site to connect to the online application in accordance with the split tunnel policy by providing the split tunnel policy to a virtual private network (VPN) client executed by an end-user device at the particular end-user site.

2. The method as in claim 1, wherein the split tunnel policy specifies a network path that the particular end-user site should use to connect to the online application.

3. The method as in claim 1, wherein the split tunnel policy causes the particular end-user site to connect to the online application via a particular direct Internet access connection.

4. The method as in claim 1, wherein the split tunnel policy causes the particular end-user site to connect to the online application using a particular virtual private network path and via a backhaul connection through a particular data center.

5. The method as in claim 1, wherein the VPN client causes the end-user device to connect to the online application via a network path specified by the split tunnel policy provided to the VPN client.

6. The method as in claim 1, wherein the one or more end-user sites from which the device obtains the path probe data differ from the particular end-user site.

7. The method as in claim 1, wherein the prediction is based in part on a forecasted service level agreement violation.

8. The method as in claim 1, wherein path probe data comprises page load time metrics for the online application.

9. The method as in claim 1, wherein causing the particular end-user site to connect to the online application in accordance with the split tunnel policy comprises:
   receiving, at the device and from a user interface, an instruction to apply the split tunnel policy to the particular end-user site.

10. The method as in claim 1, wherein the online application is a software-as-a-service (SaaS) application.

11. An apparatus, comprising:
    one or more network interfaces;
    a processor coupled to the one or more network interfaces and configured to execute one or more processes; and
    a memory configured to store a process that is executable by the processor, the process when executed configured to:
       obtain path probe data between one or more end-user sites and an online application;
       make, based on the path probe data, a prediction using a trained forecasting model as to whether a direct Internet access path or a backhaul path would offer better application performance for the online application;
       generate, based on the prediction, a split tunnel policy for a particular end-user site; and
       cause the particular end-user site to connect to the online application in accordance with the split tunnel policy by providing the split tunnel policy to a virtual private network (VPN) client executed by an end-user device at the particular end-user site.

12. The apparatus as in claim 11, wherein the split tunnel policy specifies a network path that the particular end-user site should use to connect to the online application.

13. The apparatus as in claim 11, wherein the split tunnel policy causes the particular end-user site to connect to the online application via a particular direct Internet access connection.

14. The apparatus as in claim 11, wherein the split tunnel policy causes the particular end-user site to connect to the online application using a particular virtual private network path and via a backhaul connection through a particular data center.

15. The apparatus as in claim 11, wherein the VPN client causes the end-user device to connect to the online application via a network path specified by the split tunnel policy provided to the VPN client.

16. The apparatus as in claim 11, wherein the one or more end-user sites from which the apparatus obtains the path probe data differ from the particular end-user site.

17. The apparatus as in claim 11, wherein the prediction is based in part on a forecasted service level agreement violation.

18. The apparatus as in claim 11, wherein path probe data comprises page load time metrics for the online application.

19. The apparatus as in claim 11, wherein the apparatus causes the particular end-user site to connect to the online application in accordance with the split tunnel policy by:
receiving, from a user interface, an instruction to apply the split tunnel policy to the particular end-user site.

20. A tangible, non-transitory, computer-readable medium storing program instructions that cause a device to execute a process comprising:
obtaining, by the device, path probe data between one or more end-user sites and an online application;
making, by the device and based on the path probe data, a prediction using a trained forecasting model as to whether a direct Internet access path or a backhaul path would offer better application performance for the online application;
generating, by the device and based on the prediction, a split tunnel policy for a particular end-user site; and
causing, by the device, the particular end-user site to connect to the online application in accordance with the split tunnel policy by providing the split tunnel policy to a virtual private network (VPN) client executed by an end-user device at the particular end-user site.

* * * * *